United States Patent [19]

Crevits

[11] Patent Number: 5,509,059
[45] Date of Patent: Apr. 16, 1996

[54] METHOD FOR THE ESTABLISHMENT IN A COMMUNICATION SYSTEM OF A CONNECTION BETWEEN A COMMUNICATION TERMINAL APPARATUS AND A PLURALITY OF FURTHER APPARATUS

[75] Inventor: Luc Crevits, Tielt, Belgium

[73] Assignee: Siemens Aktiengesellschaft, Munich, Germany

[21] Appl. No.: 333,865

[22] Filed: Nov. 3, 1994

Related U.S. Application Data

[63] Continuation of Ser. No. 937,495, Aug. 28, 1992, abandoned.

[30] Foreign Application Priority Data

Aug. 29, 1991 [DE] Germany .......................... 41 28 777.0

[51] Int. Cl.⁶ .................................................. H04M 3/56
[52] U.S. Cl. ...................................... 379/202; 370/110.1
[58] Field of Search ............................... 379/202, 61, 62; 348/14, 15, 16; 370/110.1

[56] References Cited

U.S. PATENT DOCUMENTS

| | | | |
|---|---|---|---|
| 4,682,351 | 7/1987 | Makino | 379/62 |
| 4,802,200 | 1/1989 | Murata et al. | 379/61 |
| 4,975,902 | 12/1990 | Damany | 379/202 |
| 5,237,602 | 8/1993 | Lazik | 379/61 |

Primary Examiner—Ahmad F. Matar
Attorney, Agent, or Firm—Hill, Steadman & Simpson

[57] ABSTRACT

Method for the establishment in a communication system of a connection between a communication terminal apparatus and a plurality of further apparatus. To accelerate the switching-on of the respective apparatus of the plurality of further apparatus (separate loudspeaker, loudspeaker of the terminal apparatus) for the purpose of a group announcement, on the basis of a group-individual identification number (KZ), a switch-on request is generated by a computer control (ASt) and is simultaneously transmitted to a limited number (maximum number) of apparatus of the plurality of further apparatus by the computer control (ASt). A counter (PZ), set for this number, is decremented for each receipt information item (ZRS) received by the computer control from the limited number of apparatus. Further switch-on requests (VA) are then transmitted to the apparatus of the plurality of further apparatus until the maximum predetermined number is again reached. With the receipt signal of the last group (KE-D-Bg) of the group (GR) the operator at the communication terminal is informed by a corresponding tone (TSg) that the effective switching-on of all the free apparatus of the group has taken place.

13 Claims, 3 Drawing Sheets

METHOD FOR THE ESTABLISHMENT IN A COMMUNICATION SYSTEM OF A CONNECTION BETWEEN A COMMUNICATION TERMINAL APPARATUS AND A PLURALITY OF FURTHER APPARATUS

This is a continuation of application Ser. No. 937,495, filed Aug. 28, 1992 (now abandoned).

BACKGROUND OF THE INVENTION

The present invention relates to a process for the establishment of a connection between an originating communication apparatus and a plurality of apparatus in the form of separate loudspeakers and/or of communication terminal apparatus having loudspeakers, each of which is connected to a program-controlled communication installation. A call-through, that is a group announcement is placed by an operator of the originating communication apparatus simultaneously for this plurality of apparatus the group announcement occurs over each of the activated loudspeakers. The communication installation has apparatus-referred units for signal-type individual switching on of the apparatus. A coupling network (that is, a switching network) for the switching-through of the connection paths and a programmable digital computer system form the central control of the communication installation, with at least one system memory for the storing of program modules and of data. The digital signaling information data is conveyed over a signaling channel and the speech information data is conveyed over a voice channel.

Contemporary digital computer-controlled communication mediation installations permit the use of different communication transmission apparatus. These can differ, therefore, in their connection type and, if need be in the respective dialing processes. Thus, for example, digital subscriber connection component groups are used for the connecting of digital communication transmission apparatus. Analog communication sending apparatus are connected with "analog connection technology". The underlying communication mediation installation consists in principle of a large number of mediation function units and a programmable digital computing system that controls these function units and monitors all the mediation execution. For this purpose the computing system is provided with information data about the operating state of the function units and about state changes, especially about inputs to the connected terminal apparatus. It can, therefore if necessary draw up and issue corresponding control instructions and messages.

Such communication mediation installations, especially telephone auxiliary-exchange installations, are also capable of additional control processes going beyond the mediation process proper. Such additional functions are in general designated as performance features, in which especially for the communication service "speech", a large number of different performance features are known. Such performance features can be initiated either during the mediation process or else during an already existing communication connection. This can occur, for example, by selecting certain characteristic digits, and characteristic digit combination and/or by the actuation of so-called function keys. Such performance features include, for example, acoustic instructions for waiting subscribers, the presentation of user instructions on an optical display arrangement and the direct addressing of a dialed subscriber. For this a subscriber can effectively switch on the loudspeaker at the terminal apparatus of the desired subscriber for hands free operation. It is provided that such an effecting switching of the loudspeaker can also be accomplished by a subscriber on a plurality of connected terminal apparatus. Then over the connections built up by this subscriber there can simultaneously occur a call-through or group announcement to the other selected subscribers. One possible solution is that the connection build-up to the selected apparatus can occur successively. Beginning with the first of the apparatus provided for such a collective call-through after the sending-out of a command information instruction for the effective switching-on of the loudspeaker, the arrival of the return message confirming this switching-on first switches through the connection and the connection to the next apparatus of the apparatus series is built up. After each reception of a return-report from an apparatus, the next connection build-up is brought about in the same manner. This is then continued successively up to the last of the apparatus selected for this initiated call-through operation. In such a conceivable execution the system-conditioned transit times are added up, so that, especially in the case of a large number of apparatus to be addressed, an undesirable great span of time is required before the intended call-through can be effected. Depending on the number of apparatus the waiting time by the person who intends to broadcast a message can be very annoying. Furthermore, such an execution is linked with relatively expensive performance-feature-specific programming procedures, which impact the mediation procedures.

SUMMARY OF THE INVENTION

Underlying the present invention is the problem of providing a process in which with simple control procedures a simultaneous call-through, that is a group announcement, of a subscriber to a large number of apparatus is possible. The time span is to be minimized between the activation of the performance feature "collective call-through" and the actual switching-on of the totality of the apparatus to be addressed. This problem is solved by a method that involves a group of apparatus to be called upon for a call-through, stored in the system memory by reason of an input made by the operator on the originating communication apparatus and characterizing at least the service. First of all for a fixed limited maximum number of apparatus, for which no communication relation exists, through the computer system there is brought about the simultaneous transmission in each case of one command information item for the activation of the respective loudspeaker over the signaling channel. Each activation of the loudspeaker is reported back by an information item identifying the called apparatus and sent out from it as receipt information to the computer control. Thereupon the connection build-up procedure is initiated, and the connection to the apparatus in question is established. On the basis of each initiated receipt information item the transmission of the command information to the next apparatus of the prescribed sequence is initiated until the maximum number of apparatus to be called is again reached. In this manner these call-ups are continued and by reason of the receipt information for the last apparatus of the group an attention signal informing the operator about the accomplished activation of all the apparatus of the group is transmitted to the originating communication apparatus.

The number of apparatus that are in the state of "call-up" is chosen in such a way that in respect to the other processes proceeding in the system a dynamic overloading is avoided. In a predetermined manner a number is chosen which requires for the total connection build-up a time which approximately corresponds to that in which a receipt information message is received from a first of these simultaneously addressed apparatus. This results in, in contrast to a serial treatment, the advantage that the time period that is necessary to activate all the apparatus to be addressed is reduced by the relation of this maximum apparatus number of the "start group".

According to a further development of the process according to the present invention several groups of apparatus are provided which are formed of at most a predetermined number of subgroups having apparatus. The groups can have different combinations of subgroups and information elements indicative thereof are stored in the system memory. When a collective call-through is necessary, each of the apparatus allocated according to certain criteria to each group are callable by an individually allocated input by the operator. The apparatus present, therefore, can be joined into such groups according to the most diverse viewpoints. One subgroup, accordingly, can be arranged in one or more groups. The allocations chosen are possible in an arbitrary mixture and can be changed without problems.

According to a further development of the process according to the present invention a counter provides that the maximum number of apparatus called upon is not exceeded. This counter, realized in a simple manner by a software solution, is decremented by one counting value with each initiated receipt signal and incremented by one counting value with each transmitted command information item, in which arrangement the counter value corresponding to the predetermined maximum number of apparatus addressed is not exceeded. With the initiating of the performance feature "collective call-through" the counter is numerically set to a value corresponding to the start group and the sending-out of the command information units is controlled such that this value determining the number of simultaneous call-ups is retained up to the calling up of the last apparatus of the group.

Proceeding from a special mediation state in which an external connection was transferred into the waiting state by the request for this connection, in like manner by a group-individual input that additionally characterizes this special mediation state, from the various groups of the apparatus are callable in the above-mentioned manner for each group. The subscriber who inputs a certain code information identifies himself as an addressed subscriber, and can then directly enter into a conversation connection with the waiting subscriber. He is switched through in this specially characterized state by the central control to this connection.

In this special case, therefore, the procedures (programs) provided for a collective call-through are used unaltered, since the corresponding storage ranges are controlled directly by the input code information.

A further development of the process provides that both the activation of a loudspeaker in a terminal apparatus, as well as, the activation of all the free apparatus of the particular called-up group are displayed by an optical or acoustic attention signal. The individual subscribes are informed in advance about a following message (call-through) and the operator who intends to broadcast this message is informed that he can now begin the message (call-through).

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
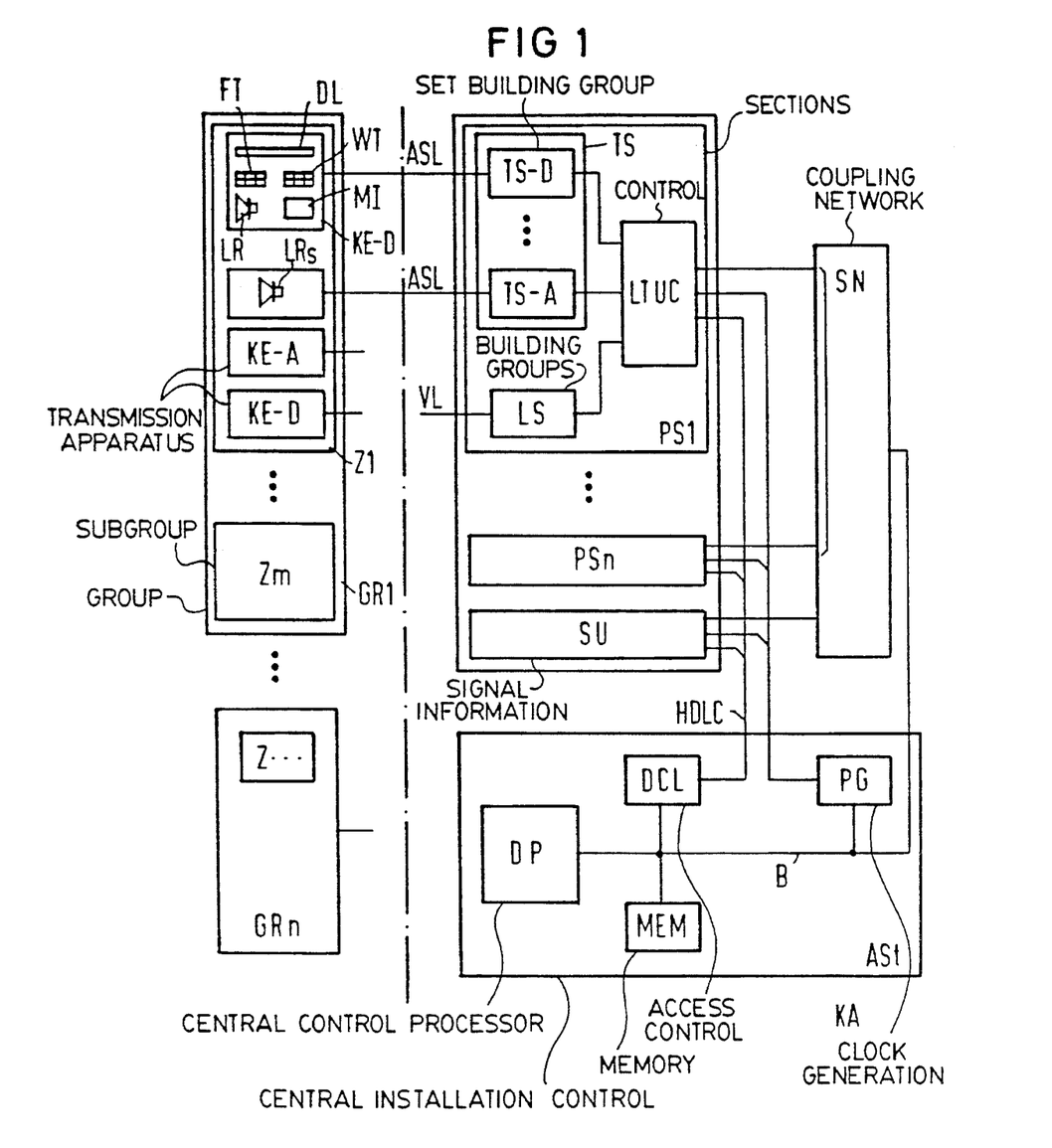
FIG. 1 is a block diagram of a communication mediating installation including communication terminal apparatus.

The central component of the digital communication installation KA represented schematically in FIG. 1 is a coupling network (switching network) SN, by means of which communication transmission apparatus KE-D and KE-A are connected to one another or to a public mediation installation or to lines VL leading to other auxiliary exchange installations. The central coupling network SN is controlled by central installation control ASt, which represents a hierarchically uppermost level of the communication installation. This level is formed by a central control processor DP, which coordinates the interaction of all the building blocks and modules of the communication installation KA. Besides a clock generation arrangement PG the installation control ASt is equipped with an access control DCL connected on an input side, and a memory MEM. The unit DCL serves as a section place (portion or area of the periphery) for the periphery, which as "Master" of a HDLC connection carries out the protocol treatment on a signaling channel. In the memory MEM, for example there are stored the mediation data base and all the mediation relevant programs and appertaining data. Essential functions of the central control processor DP are, therefore, the storage and processing of mediation programs and the control and monitoring of the local bus LB to which, on a peripheral side, are connected the units DCL and the coupling network SN. Additional typical functions of the central data processor DP are, for example, operation developments and safety displays.

An essential component of the periphery consists of the peripheral section places PS1 . . . PSn, which have set subscriber-related building groups LS. To these peripheral section places PS1 . . . PSn there is allocated a section place control LTUC. This controls the connection build-up between the communication transmitting apparatus KE-A, KE-D, in which is provided a program for effecting the connection build-up process. In the section places PS1 . . . PSn the processes or program modules for the signaling protocols are implemented. The services, performance features, etc. with respect to the entitlement examination, as well as, the connection build-up processes or program modules serving for the connection control over the digital central coupling network SN are implemented in the central installation control ASt.

The periphery is supplemented by a module SU, which serves for the supplying of the communication mediation installation KA with signaling information and with musical interplays performed during a holding state of connections. This module SU contains, furthermore, signaling-support arrangements, as well as, testing arrangements. This additional module is (in a similar manner to the section places PS1 ... PSn) switched over a PCM-structured connection as well as over a transmission link serving for the transmission and reception of control information. The information items are transmitted, for example, in the standardized transmission process HDLC.

To the communication installation KA there can be connected, besides digital communication transmission apparatus KE-D, conventional terminal apparatus KE-A with analog transmission over a respective connecting line ASL. This occurs for each peripheral section place PS1 ... PSn for the digital communication transmission apparatus KE-D over a set building group TS-D governing the corresponding digital information transmission and for the analog communication terminal apparatus through a correspondingly adapted set building group TS-A. The set building groups TS-D and TS-A are present for each section place and serve to transform the differing signaling information data of the individual terminal apparatus and (with respect to the sentence building group LS) of other networks to a form used uniformly within the communication installation. At each set building group TS there are accessible in each case a plurality of line connections.

A digital communication transmission apparatus which presents, for example, exclusively a speech terminal apparatus is equipped as a rule with a display DL, a keyboard WT and a set of function keys FT. The speech terminal apparatus also has a microphone MI and a loudspeaker LR. At analog telephone terminal apparatus KE-A, a loudspeaker LRs which is used, for example, as a room loudspeaker, can be connected over a connecting line ASL to a set building group TS-A that is designed for such analog connections.

It is possible in the installation, from an operating or mediating location or also from any arbitrary subscriber terminal apparatus to undertake a so-called collective call-through. In such a case there is initiated by an operator or an internal telephone subscriber the effective switching-on of the loudspeakers LR in telephone terminal apparatus defined in advance and also of separate loudspeakers LRs. The apparatus to be addressed in each case in the form of telephone terminal apparatus or of separate loudspeakers are combined in various groups GR1–GRn. The apparatus belonging by definition to a group are themselves arranged in individual subgroups Z1–Zm. Each of these subgroups comprises a maximum number of apparatus, for example, of 20 apparatus. An apparatus can be (as already mentioned) for example, a digital telephone terminal apparatus KE-D or a separate loudspeaker LRs. Each subgroup can be allocated to one or more main groups GR1–GRn. The individual subgroups and main groups can be selected according to viewpoints meaningful for the installation operator. Through the organization in subgroups, from which then, in turn, a main group is composed, the possibilities for the addressing of subscribers in connection with a collective call-through can be formed in an extremely variable manner. The call-through can be initiated for each main group by inputting a code number KZ that is assigned to this group, by the operator.

Figure 2:
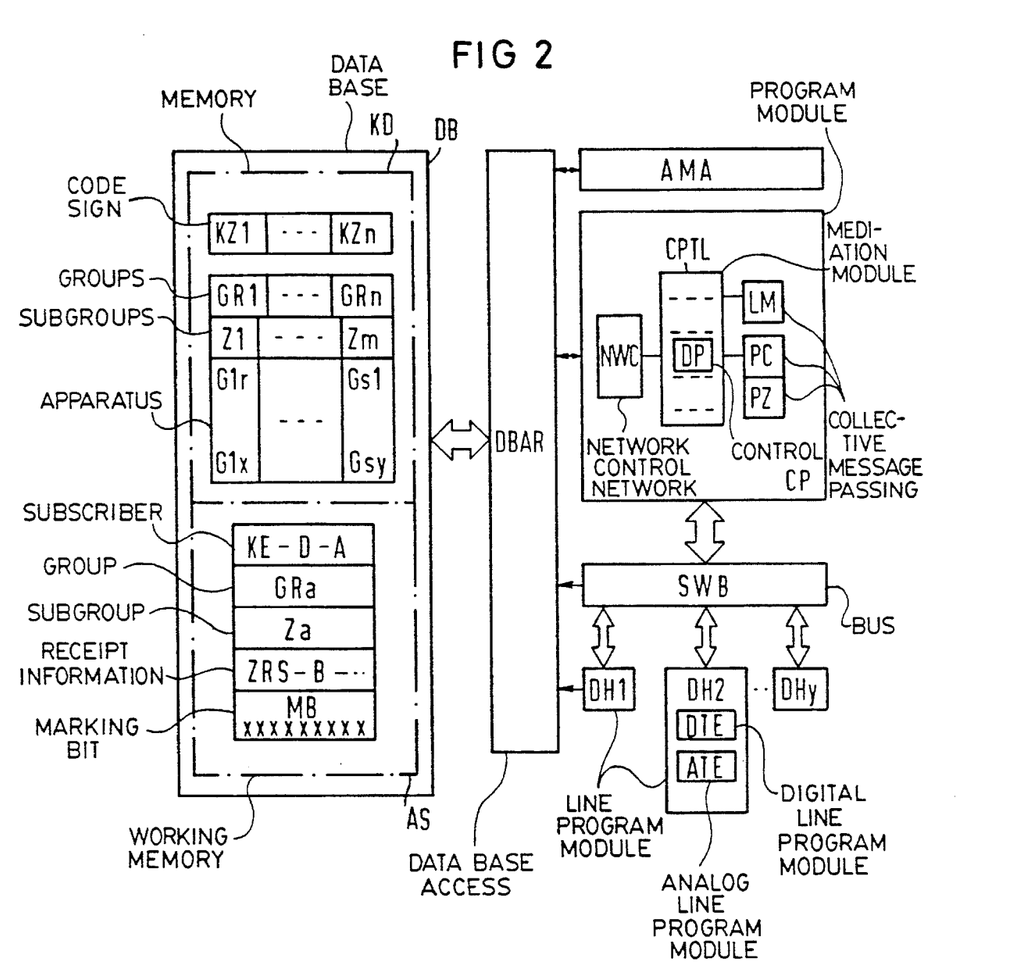
FIG. 2 depicts the control structure of a digital communication mediation installation which serves for the execution of the process according to the present invention.

The customer established allocations of the apparatus KE-D and KE-A connected to the communication installation KA for the particular group are stored according to FIG. 2 in a fixed memory area KD (such as a read only memory) containing the customer data of the data base DB. In this data base all mediation relevant programs are also stored. They can be contained, for example in memory MEM of FIG. 1. A further memory area can be, for example a working memory AS (such as a random access memory) of the computer system ASt of the communication installation, in which the dynamic data arising in connection with a collective word-passing is stored.

The control structure of the digital communication installation represented in FIG. 2 has a modular character and presents two hierarchic levels of the program control. One of them serves by means of line program modules DH1, DH2 ... DHy (Device Handler) adapted in each case to a communication sending apparatus type for the control of peripheral apparatus. To these there belong not only the communication terminal apparatus KE that are connected to the periphery, but also central circuit arrangements, such as switch-on sets and coupling network. Each of these line program modules DH offers a system-uniform section place for the mediation structure level, which in the present case is represented by a mediation procedure program module CP. In the line structure level DH there are arranged so-called line program modules DTE for digital terminal apparatus and modules ATE for analog terminal apparatus in the program module DH2 allocated to the individual terminal apparatus types. In the mediation control structure level there are provided submodules for different subassignments of the connection control. The information exchange between the performance structure level and the mediation structure level occurs by means of defined messages which are transmitted over a software bus structure SWB. This can be regarded as an integral component of the operating system of the communication mediation installation computer. The mediation control program module CP, the line program modules DH1, DH2 ... DHy and the software bus SWB have, by means of data base access routines DBAR, access to the data base DB of the entire communication installation. Besides the mediation procedure program module CP further modules are provided, of which by way of example is an operating program module AMA. These serve for the development of operating assignments. To at least a part of them, likewise over defined data base access routines, the data base DB is accessible.

The line program modules DH1, DH2 ... DHy are constructed, communication-apparatus type specifically, in such a way that they control in each case the corresponding communication transmission apparatus type. The mediation-procedure program module CP is independent of the type of communication transmission apparatus and communication-service independent in its structure in such a way that it controls the peripheral apparatus and arrangement. The assignments of the mediation-procedure program module CP comprise, therefore, the subprocesses necessary for the control of the connection build-up and breakdown of the entire mediation procedure. Thus, for example corrections are checked and dialing controls are carried out.

There also occurs a signaling of mediation states between the communication terminal apparatus and from this an activation and deactivation is feasible of mediation performance features from the various mediation states.

An essential feature of the mediation structure level CP is the mediation-procedure program module CPTL (Call Processing Trunk Line), which again is subdivided into different submodules. The mediation-technical control procedures are carried out by a communication-installation control DP schematically represented in FIG. 2 within the unit CPTL. Substituting for the performance feature program modules provided in the attachment, the module LM and the module PC provided in connection with a collective message passing is shown. To the performance-feature program modules there is also a network control program module NWC, with which the entire logical connection storage control and the control of the coupling network SN is realized.

The theoretical structure of permanent and dynamic data allocated in a collective call-through process to be developed by the program module PC is indicated in the data base DB. In the sub-area KD the permanent data is interrogated during a collective calling-through initiated by a communication terminal apparatus and at least partially taken over into the working memory are AS of the data base DB.

The permanent memory areas KD of the data base DB contain, besides the other system configuration data, data relevant in connection with a collective calling-through that is to be carried out. It is stored there by using a code sign DZ that is allocated in each case to one of the main groups GR1–GRn formed according to certain viewpoints from the subgroups. Further, those subgroups Z1–Zm are stored which belong in each case to a main group GR. There can be formed, for example, eight main groups and eight subgroups. It is possible for one of the subgroups Z1–Zm to be allocated to one or more main groups. For each of the individual subgroups Z1–Zm there is stored a list of the apparatus which belong in each case to this subgroup Z1–Zm. Thus, for example, the apparatus G1r . . . G1x should form the subgroup Z1. For "x" there can be established, for example, a maximum value of "20". Then, for the other subgroups in each case the appertaining apparatus are likewise allocated according to a list. Thus, for example, to the subgroup Zm there belong the apparatus Gs1 . . . Gsy, in which "y" can take on, for example, values from one to 20. In a main group, therefore, in the example of execution with eight subgroups with a maximum of 20 apparatus for each of these subgroups in a main group there can be a total maximum of 160 apparatus.

Fundamentally in each initiation of a connection build-up procedure by a communication terminal apparatus a storage area allocated to this apparatus is interrogated in the data base for storing permanent data. In the scope of this interrogation the calling communication terminal apparatus is clearly identified. The services and characteristics stored in it with respect to usable performance features are read and, if need be, stored in a storage area of the data base for storing dynamic data. Further, the physical functions contained therein, such as, for example, the terminal apparatus section places, are read and stored. This data is evaluated or interrogated in the course of the connection build-up and in initiation of mediation procedures.

Now if a subscriber intends to make a collective call-through, he selects the characteristic number KZ . . . of the main group that is provided for this. This identification can define both the group and also the performance feature "collective call-through". There can also be provided for this the combination of the actuation of a function key and of the subsequent dialing-in of an identification number. Thereupon the storage area allocated to the performance feature "collective call-through" is interrogated. On the basis of the information entered in the storage area AS the control perceives which subgroups and which apparatus within these subgroups must be addressed. In cooperation with the network control program module NWC, connections are built up between the subscriber KE-D-A intending a collective call-through and the established apparatus. As is to be learned from the flow diagram of the signalings according to FIG. 3, through the sub-module CP-A allocated to the mediation control structure level CP in the example of execution for the first ten apparatus of the GR group selected by the identification number, there is brought about the effective switching-on of the respective loudspeaker in the digital terminal apparatus KE-D or the establishment of a direct connection to the separate loudspeaker LRs KE-A defined as analog terminal apparatus KE-A. The number of the simultaneously transmitted command information items is chosen in such a way that that system is not overloaded. Ten apparatus, for example, can receive a call-up simultaneously. The subgroups, to which the apparatus actually called up, are also stored in each case in the storage area AS as corresponding information Za. In cooperation with the program module PC called upon in a call-through, a counter PZ likewise realized in software, in correspondence to the simultaneously sent-out call-ups VA is set on the value "10" assumed for the example of execution. Which of the ten apparatus called up by the signaling VA1 . . . VA10 is a matter of which apparatus which in the corresponding check by the mediation control of the system were recognized as being in the "free state".

Figure 3:
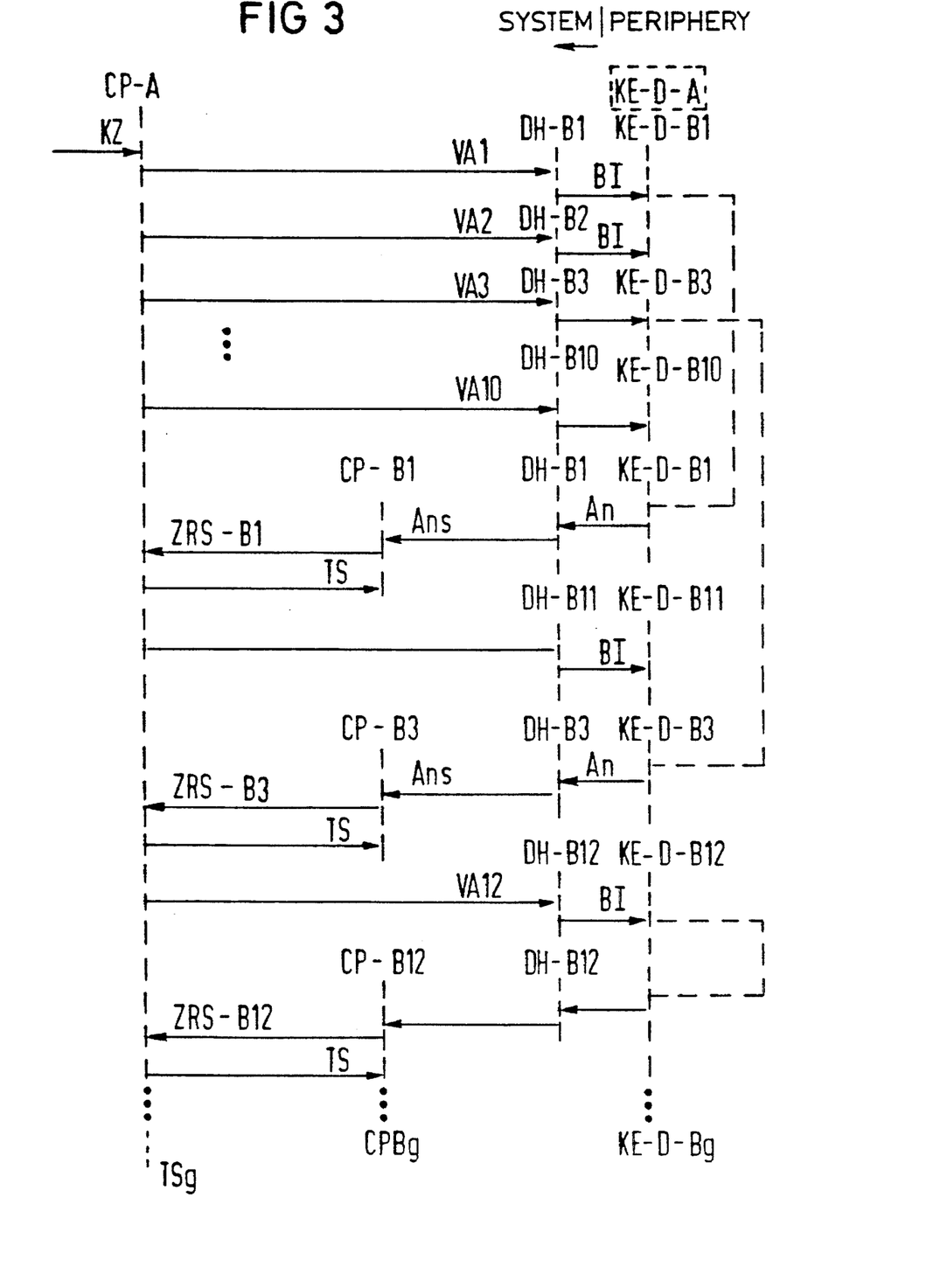
FIG. 3 is a flow diagram of message reports underlying the process of the present invention.

If a called apparatus gives a return report An to the corresponding module of the line structure level DH, then by the report Ans generated in the mediation control structure level there is generated a receipt information item ZRS. On the basis of each receipt information item for a digital terminal apparatus there is initiated the connection build-up procedure and the connection is established. In a separate loudspeaker as called apparatus the receipt information is generated with the connection establishment in the line structure level DH. Further, with each receipt information the counter PZ is set back by one counting value. If, for example, a return information item arrives from the apparatus KE-D-B1 as a first apparatus then from this is formed the receipt information ZRS . . . B1. By the sub-module CP-A which is available for the subscriber A intending a call-through, there is brought about the sending out of a tone signal TS to the digital terminal apparatus that is called upon in each case, and by which the applicable subscriber is informed about the completed switching on of the loudspeaker in the terminal apparatus. Simultaneously in the manner described a command information item BI is sent to the next free apparatus KE-D-B11 in the actually addressed zone. Simultaneously there occurs an increase in the counter value by the value "1", so that the number "10" is again reached for the simultaneously called apparatus. With each further receipt information item ZRS generated by reason of a return information report of an apparatus, in each case the next free apparatus is called upon in the manner described, to carry out the effective switching-on of the loudspeaker. By reason of other processes taking place in the system there can occur the case that the arrival of the return information is first stored in a waiting quesil, so that with the generation of the receipt information data ZRS a number of command information items BI corresponding to this number of receipt information items can be sent out simultaneously to further free apparatus. The corresponding incrementation or decrementation of the counter PZ is assured, however, in that the maximum provided number of simultaneously existing call-ups (in the example of an execution of ten call-ups) is maintained. Within this fixed configuration of in each case ten called apparatus this described execution is continued up to the call-up of the last free apparatus of the group defined by the input identification number. After the receipt sign brought about by the return information of this last apparatus KE-D-Bg, an attention signal, for example in the form of a certain audible tone Tsg is transmitted to the originating terminal apparatus KE-D-A. Therewith then the subscriber concerned is informed that the intended call-through can occur. Over the loudspeaker activated in each case then this call-through addresses those apparatus that are represented by the group Gr . . . defined with the dialed-in identification number.

As already mentioned, with the aid of the data base access procedure there are determined the address data of the apparatus that are provided over the group-specific identification number KZ for a collective call-through. In a table of the working memory area As of the data base DB according to FIG. 2, in the scope of such a call-through process there are entered the identifications ZRS-B of those apparatus from which return information has been receive over the completed switching-on of the respective loudspeaker. Besides the necessary generation of the further call-ups, thereby the time point can be determined at which there has occurred an activation of the loudspeakers in each case of all the addressed apparatus KE-D-B1 ... Ke-D-Bg. Through the permanent data stored in the storage range KD of the data base there can occur a rapid allocating of the group information defined by the dialed-in identification number t the connections to be built-up in each case.

The totally addressed subgroups Z ... are characterized in the working memory AS (FIG. 2) by a corresponding marking bit M.

In a communication installation there exists the possibility of placing an incoming conversation connection which is interrogated, for example, at the mediation place, into a holding position. It is now possible to address the desired conversation partner for this conversation by means of a collective call-through. For the characterization of this special mediation state a special identification number is dialed again, according to group to the addressed, which is distinguished from the identification number established for a normal call-through. These identification numbers are stored in a manner not represented as information in the data base. The allocated groups in each case can agree with the groups GR that are determined for the normal call-through. In such a case, therefore, the mediation control accesses the same stored lists by means of the data base access procedures. The address group of subscribers, therefore, is informed with the call-through that for a certain subscriber a conversation connection was placed into the holding state. If the subscriber concerned dials an identification number which is indicated to him, for example, on the display of a terminal apparatus, then, through the mediation control, there is brought about the switching-in of this subscriber onto the waiting connection.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for establishing in a program-controlled communication system connection between an originating communication terminal apparatus and a plurality of loudspeaker equipped apparatus, a connection facilitating a group announcement being initiated by an operator of the originating communication terminal apparatus to loudspeaker equipped apparatus in the plurality of loudspeaker equipped apparatus, the communication system having means for individually switching-on each of the loudspeaker equipped apparatus of the plurality of loudspeaker equipped apparatus, having a switching network for providing connection paths between the originating communication terminal apparatus and the plurality of loudspeaker equipped apparatus, and having a programmable digital computer system for central control of the communication system with at least one system memory for storing program modules and data, digital signaling information messages being transmitted in a signaling channel and voice information messages being transmitted in a voice channel, the signalling channel and the voice channel interconnecting the originating communication terminal apparatus and the plurality of loudspeaker equipped apparatus, said method comprising the steps of:

providing at least one group of apparatus of the plurality of loudspeaker equipped apparatus and storing in the system memory information identifying the at least one group of apparatus;

providing a predetermined maximum number of apparatus, that are presently free of communication connections and that can simultaneously receive transmissions, in the at least one group of apparatus, and providing a prescribed sequence for transmitting to the apparatus of the at least one group of apparatus at least when the number of apparatus in the at least one group is greater than the predetermined maximum number;

in response to a predetermined input to the communication system, simultaneously transmitting over the signaling channel to an initial number of apparatus of the plurality of loudspeaker equipped apparatus in the prescribed sequence up to the predetermined maximum number of apparatus in the at least one group of apparatus, a command information message for activation of respective loudspeakers of the apparatus of the at least one group of apparatus;

reporting back to the computer system over the signaling channel each activation of a loudspeaker of a respective called apparatus by a receipt information message identifying the respective called apparatus and initiated by the respective called apparatus;

initiating a connection build-up procedure and establishing a connection to the respective called apparatus that reported back;

upon receiving a receipt information message, initiating transmission of the command information message to a next apparatus in the prescribed sequence of the apparatus of the at least one group until the predetermined maximum number of apparatus is again reached, such that transmission of command information messages is continuously carried on; and upon receiving a receipt information message from a last apparatus in the prescribed sequence of apparatus of the at least one group, transmitting an attention signal, indicative of completed activation of all apparatus of the at least one group, to the originating communication apparatus and displaying the attention signal thereat.

2. The method according to claim 1, wherein several groups of apparatus are provided, each group being formed of subgroups of apparatus, each subgroup having at most a predetermined number of apparatus and subgroups being joined in a combination selected from a plurality of different combinations to form a respective group and further information being stored in the system memory identifying the subgroups of apparatus, and wherein a respective group of the several groups is selected for a group announcement by input of an identification number individually allocated thereto.

3. The method according to claim 1, wherein the computer system has a counter, and wherein the counter is decremented by one counting value with each received receipt information message and incremented by one counting value with each transmitted command information message, no command information messages being transmitted after a value of the counter is equal to the predetermined maximum number of apparatus that can simultaneously receive transmissions.

4. The method according to claim 1, wherein completed activation of a loudspeaker of a respective apparatus of the plurality of loudspeaker equipped apparatus after reception of a respective receipt information message is indicated by at least one of an optical attention signal and an acoustic attention signal at the respective apparatus.

5. The method according to claim 1, wherein after activation of all apparatus of a group, at least one of an optical attention signal and acoustic attention signal is provided at the originating communication terminal apparatus.

6. A method for establishing in a program-controlled communication system connection between an originating communication terminal apparatus and a plurality of loudspeaker equipped apparatus, a connection facilitating a group announcement being initiated by an operator of the originating communication terminal apparatus to loudspeaker equipped apparatus in the plurality of loudspeaker equipped apparatus, the communication system having means for individually switching-on each of the loudspeaker equipped apparatus of the plurality of loudspeaker equipped apparatus, having a switching network for providing connection paths between the originating communication terminal apparatus and the plurality of loudspeaker equipped apparatus, and having a programmable digital computer system for central control of the communication system with at least one system memory for storing program modules and data, digital signaling information messages being transmitted in a signaling channel and voice information messages being transmitted in a voice channel, the signalling channel and the voice channel interconnecting the originating communication terminal apparatus and the plurality of loudspeaker equipped apparatus, said method comprising the steps of:

providing several groups of apparatus of the plurality of loudspeaker equipped apparatus and storing in the system memory information identifying the groups of apparatus, each group of apparatus being formed of subgroups of apparatus, each subgroup having at most a predetermined number of apparatus and subgroups being joined in a combination selected from a plurality of different combinations to form a respective group and further information being stored in the system memory identifying the subgroups of apparatus, each group of the several groups being selected for the group announcement by input of an identification number individually allocated thereto;

providing a predetermined maximum number of apparatus, that are presently free of communication connections and that can simultaneously receive transmissions, in the selected group of apparatus, and providing a prescribed sequence for transmitting to the apparatus of the selected group of apparatus at least when the number of apparatus in the selected group is greater than the predetermined maximum number;

in response to a predetermined input to the communication system, selecting a group of apparatus from the groups of apparatus and simultaneously transmitting over the signaling channel to an initial number of apparatus in the prescribed sequence up to the predetermined maximum number of apparatus in the selected group of apparatus, a command information message for activation of respective loudspeakers of the apparatus of the selected group of apparatus;

reporting back to the computer system over the signaling channel each activation of a loudspeaker of a respective called apparatus by a receipt information message identifying the respective called apparatus and initiated by the respective called apparatus;

initiating a connection build-up procedure and establishing a connection to the respective called apparatus that reported back;

upon receiving a receipt information message, initiating transmission of the command information message to a next apparatus in the prescribed sequence of the apparatus of the selected group until the predetermined maximum number of apparatus is again reached, such that transmission of command information messages is continuously carried on; and upon receiving a receipt information message from a last apparatus in the prescribed sequence of apparatus of the selected group, transmitting an attention signal, indicative of completed activation of all apparatus of the selected group, to the originating communication apparatus and displaying the attention signal thereat.

7. The method according to claim 6, wherein the computer system has a counter, and wherein the counter is decremented by one counting value with each received receipt information message and incremented by one counting value with each transmitted command information message, no command information messages being transmitted after a value of the counter is equal to the predetermined maximum number of apparatus that can simultaneously receive transmissions.

8. The method according to claim 6, wherein completed activation of a loudspeaker of a respective apparatus of the apparatus of the selected group after reception of a respective receipt information message is indicated by at least one of an optical attention signal and an acoustic attention signal at the respective apparatus.

9. The method according to claim 6, wherein after activation of all apparatus of selected group, at least one of an optical attention signal and acoustic attention signal is provided at the originating communication terminal apparatus.

10. A method for establishing in a program-controlled communication system connection between an originating communication terminal apparatus and a plurality of loudspeaker equipped apparatus, a connection facilitating a group announcement being initiated by an operator of the originating communication terminal apparatus to loudspeaker equipped apparatus in the plurality of loudspeaker equipped apparatus, the communication system having means for individually switching-on each of the loudspeaker equipped apparatus of the plurality of loudspeaker equipped apparatus, having a switching network for providing connection paths between the originating communication terminal apparatus and the plurality of loudspeaker equipped apparatus, and having a programmable digital computer system for central control of the communication system with at least one system memory for storing program modules and data, digital signaling information messages being transmitted in a signaling channel and voice information messages being transmitted in a voice channel, the signalling channel and the voice channel interconnecting the originating communication terminal apparatus and the plurality of loudspeaker equipped apparatus, said method comprising the steps of:

providing at least one group of apparatus of the plurality of loudspeaker equipped apparatus and storing in the system memory information identifying the at least one group of apparatus;

providing a predetermined maximum number of apparatus, that are presently free of communication connections and that can simultaneously receive transmissions, in the at least one group of apparatus, and providing a prescribed sequence for transmitting to the apparatus of the at least one group of apparatus at least when the number of apparatus in the at least one group is greater than the predetermined maximum number;

in response to a predetermined input to the communication system, simultaneously transmitting over the signaling channel to an initial number of apparatus of the plurality of loudspeaker equipped apparatus in the prescribed sequence up to the predetermined maximum number of apparatus in the at least one group of apparatus, a command information message for activation of respective loudspeakers of the apparatus of the at least one group of apparatus;

reporting back to the computer system over the signaling channel each activation of a loudspeaker of a respective called apparatus by a receipt information message identifying the respective called apparatus and initiated by the respective called apparatus;

initiating a connection build-up procedure and establishing a connection to the respective called apparatus that reported back;

upon receiving a receipt information message, initiating transmission of the command information message to a next apparatus in the prescribed sequence of the apparatus of the at least one group until the predetermined maximum number of apparatus is again reached, such that transmission of command information messages is continuously carried on; and upon receiving a receipt information message from a last apparatus in the prescribed sequence of apparatus of the at least one group, transmitting an attention signal, indicative of completed activation of all apparatus of the at least one group, to the originating communication apparatus and displaying the attention signal thereat; and decrementing a counter in the computer system by one counting value with each received receipt information message and incrementing the counter by one counting value with each transmitted command information message, no command information messages being transmitted after a value of the counter is equal to the predetermined maximum number of apparatus that can simultaneously receive transmissions.

11. The method according to claim 10, wherein several groups of apparatus are provided, each group being formed of subgroups of apparatus, each subgroup having at most a predetermined number of apparatus and subgroups being joined in a combination selected from a plurality of different combinations to form a respective group and further information being stored in the system memory identifying the subgroups of apparatus, and wherein a respective group of the several groups is selected for a group announcement by input of an identification number individually allocated thereto.

12. The method according to claim 10, wherein completed activation of a loudspeaker of a respective apparatus of the plurality of loudspeaker equipped apparatus after reception of a respective receipt information message is indicated by at least one of an optical attention signal and an acoustic attention signal at the respective apparatus.

13. The method according to claim 10, wherein after activation of all apparatus of a group, at least one of an optical attention signal and acoustic attention signal is provided at the originating communication terminal apparatus.

* * * * *